US011551474B2

(12) United States Patent
Ye

(10) Patent No.: US 11,551,474 B2
(45) Date of Patent: Jan. 10, 2023

(54) FAKE VIDEO DETECTION

(71) Applicant: Sony Interactive Entertainment Inc., Tokyo (JP)

(72) Inventor: Xiaoyong Ye, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 57 days.

(21) Appl. No.: 16/658,980

(22) Filed: Oct. 21, 2019

(65) Prior Publication Data

US 2021/0117650 A1 Apr. 22, 2021

(51) Int. Cl.
*G06N 3/04* (2006.01)
*G06N 3/08* (2006.01)
*G06T 7/00* (2017.01)
*G06V 20/40* (2022.01)
*G06V 40/16* (2022.01)
*G06V 10/82* (2022.01)

(52) U.S. Cl.
CPC ......... *G06V 40/164* (2022.01); *G06N 3/0454* (2013.01); *G06T 7/97* (2017.01); *G06V 20/46* (2022.01); *G06V 40/169* (2022.01); *G06T 2207/20081* (2013.01); *G06T 2207/20084* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 6,343,204 B1* | 1/2002 | Yang | H04N 1/00846 |
| | | | 382/137 |
| 10,631,036 B1 | 4/2020 | Rabbat et al. | |
| 10,896,493 B2* | 1/2021 | Safdarnejad | G06V 10/82 |
| 10,938,852 B1* | 3/2021 | Streit | G06K 9/6255 |
| 10,964,006 B2* | 3/2021 | Niener | G06V 20/00 |
| 2010/0315495 A1 | 12/2010 | Ellingson | |
| 2016/0328622 A1 | 11/2016 | Troy et al. | |
| 2017/0124385 A1 | 5/2017 | Ganong et al. | |
| 2018/0254046 A1 | 9/2018 | Khoury et al. | |
| 2018/0307815 A1* | 10/2018 | Samadani | G06F 21/32 |
| 2019/0209052 A1* | 7/2019 | Jeanne | G06V 40/164 |
| 2019/0366981 A1 | 12/2019 | Huang et al. | |
| 2019/0385380 A1* | 12/2019 | Yoon | G06T 19/006 |
| 2020/0065526 A1 | 2/2020 | Berman | |
| 2020/0184278 A1* | 6/2020 | Zadeh | G06K 9/6264 |
| 2020/0309930 A1* | 10/2020 | Zhou | G06V 40/172 |
| 2021/0233204 A1* | 7/2021 | Alattar | G06T 1/005 |
| 2021/0248801 A1* | 8/2021 | Li | G06T 17/20 |

OTHER PUBLICATIONS

Cristin et al., "Illumination-based texture descriptor and fruitfly support vector neural network for image forgery detection in face images," IET Image Process., 2018, vol. 12 Iss. 8, pp. 1439-1449 (Year: 2018).*

(Continued)

*Primary Examiner* — Soo Shin
(74) *Attorney, Agent, or Firm* — John L. Rogitz

(57) ABSTRACT

Detection of whether a video is a fake video derived from an original video and altered is undertaken using both image analysis and frequency domain analysis of one or more frames of the video. The analysis may be implemented using neural networks.

13 Claims, 12 Drawing Sheets

(56) References Cited

OTHER PUBLICATIONS

Fernandez et al., "Digital Image Tamper Detection Technique Based on Spectrum Analysis of CFA Artifacts," Sensors 2018, 18, 2804; doi:10.3390/s18092804 (Year: 2018).*

Ali et al., "Face Spoofing Attack Detection Using Spatial Frequency and Gradient-Based Descriptor," KSII Transactions on Internet and Information Systems vol. 13, No. 2, Feb. 2019 (Year: 2019).*

Zhang et al., "Detecting and Simulating Artifacts in GAN Fake Images," arXiv:1907.06515v1 [cs.CV] Jul. 15, 2019 (Year: 2019).*

Amerini et al., "Localization of JPEG double compression through multi-domain convolutional neural networks," 2017 IEEE Conference on Computer Vision and Pattern Recognition Workshops (Year: 2017).*

Cristin, Rajan et al. Illumination-based texture descriptor and fruitfly support vector neural 1-16network for image forgery detection in face images. The Institution of Engineering andTechnology, Mar. 16, 2018 (Mar. 16, 2018), [online], Retrieved fromthe Internet ,entire document, especially Abstract; p. 1-2, 5-6.

Fernandez, et al. Digital Image Tamper Detection Technique Based on Spectrum Analysis of CFA Artifacts. Sensors 2018, 18, 2804, Aug. 25, 2018 (Aug. 25, 2018), pg [online], Retrieved from the Internet, entire document, especially Abstract; p. 3-4, 7.

International Search Report and Written Opinion dated Feb. 11, 2021 from the counterpart PCT application PCT/US20/55349.

U.S. Appl. No. 16/597,698, filed Oct. 9, 2019, Xiaoyong Ye.
U.S. Appl. No. 16/658,980, filed Oct. 21, 2019, Xiaoyong Ye.
U.S. Appl. No. 16/659,041, filed Oct. 21, 2019, Xiaoyong Ye.

Roozenbeek et al., "Fake News Game Confers Psychological Resistance Against Online Misinformation", Jun. 25, 2019, https://doi.org/10.1057/s41599-019-0279-9.

Xiaoyong Ye, "Fake Video Detection Using Video Sequencing", file history of related U.S. Appl. No. 16/659,041, filed Oct. 21, 2019.

Ye, Xiaoyong and Warren Benedetto, "Fake Video Detection Using Blockchain", file history of related U.S. Appl. No. 16/597,698, filed Oct. 9, 2019.

* cited by examiner

RECORDING/UPLOAD/DOWNLOAD

PLAY BACK

AUTOGAN RECONSTRUCTED IMAGE

FAKE VIDEO DETECTION

FIELD

The application relates generally to technically inventive, non-routine solutions that are necessarily rooted in computer technology and that produce concrete technical improvements.

BACKGROUND

As understood herein, modern digital image processing, coupled with deep learning algorithms, presents the interesting and entertaining but potentially sinister ability to alter a video image of a person into the image of another person, or to alter the video of the person in such a manner as to speak words, in the person's voice, that the person in fact never spoke. While such a capability can be used in a light-hearted manner, it can also be used to defame an individual by making appear as if the person spoke disparaging things. Accordingly, techniques are provided herein to determine whether a video is genuine or is a fake generated by machine learning.

SUMMARY

Accordingly, a system includes at least a face detection module for receiving an image and determining whether at least one texture irregularity on a face in the image or between the face and background in the image or both is present in the image. The system also includes at least a first neural network for receiving the image, at least one discrete Fourier transform (DFT) for receiving the image and outputting a spectrum to at least a second neural network, and at least a detection module for accessing features output by the face detection module, the first neural network, and the second neural network to determine whether the image is altered from an original image and provide output representative thereof.

The texture irregularity may include a checkerboard pattern.

The detection module may determine the image is altered from an original image at least in part by detecting at least one irregularity in the spectrum.

The irregularity in the spectrum may include at least one region of brightness that is brighter than a corresponding region in the original image. The region of brightness may be located along a periphery of the image in a frequency domain. Indeed, the irregularity in the spectrum may include plural regions of brightness located along a periphery of the image in a frequency domain.

The face detection module may be configured for outputting a feature vector indicating a lighting irregularity on a face in the image indicating that the image has been altered from the original image.

In another aspect, a method includes processing an image through a face detection module to output feature vectors indicating at least one lighting irregularity on a face in the image, or at least one texture irregularity in the image, or both. The method also includes processing the image through at least one discrete Fourier transform (DFT) and at least one neural network to output feature vectors indicating at least one irregularity in the image in the frequency domain, and returning an indication that the image has been altered from an original image at least in part based on the feature vectors.

In another aspect, an apparatus includes at least one computer storage medium with instructions executable by at least one processor to process an image through an image detection module to determine whether an irregularity exists in the image in a spatial domain. The instructions are executable to convert the image to a frequency domain and to process the image in frequency domain to determine whether an irregularity exists in the frequency domain. The instructions are executable to, based at least in part on determining that an irregularity exists in the image, output an indication that the image is digitally altered from an original image.

The indication that the image is digitally altered from an original image may be output responsive to determining either one of an irregularity in the frequency domain or an irregularity in the spatial domain. Or, the indication that the image is digitally altered from an original image may be output only responsive to determining both an irregularity in the frequency domain and an irregularity in the spatial domain exists in the image.

The details of the present application, both as to its structure and operation, can best be understood in reference to the accompanying drawings, in which like reference numerals refer to like parts, and in which:

DETAILED DESCRIPTION

Figure 1:
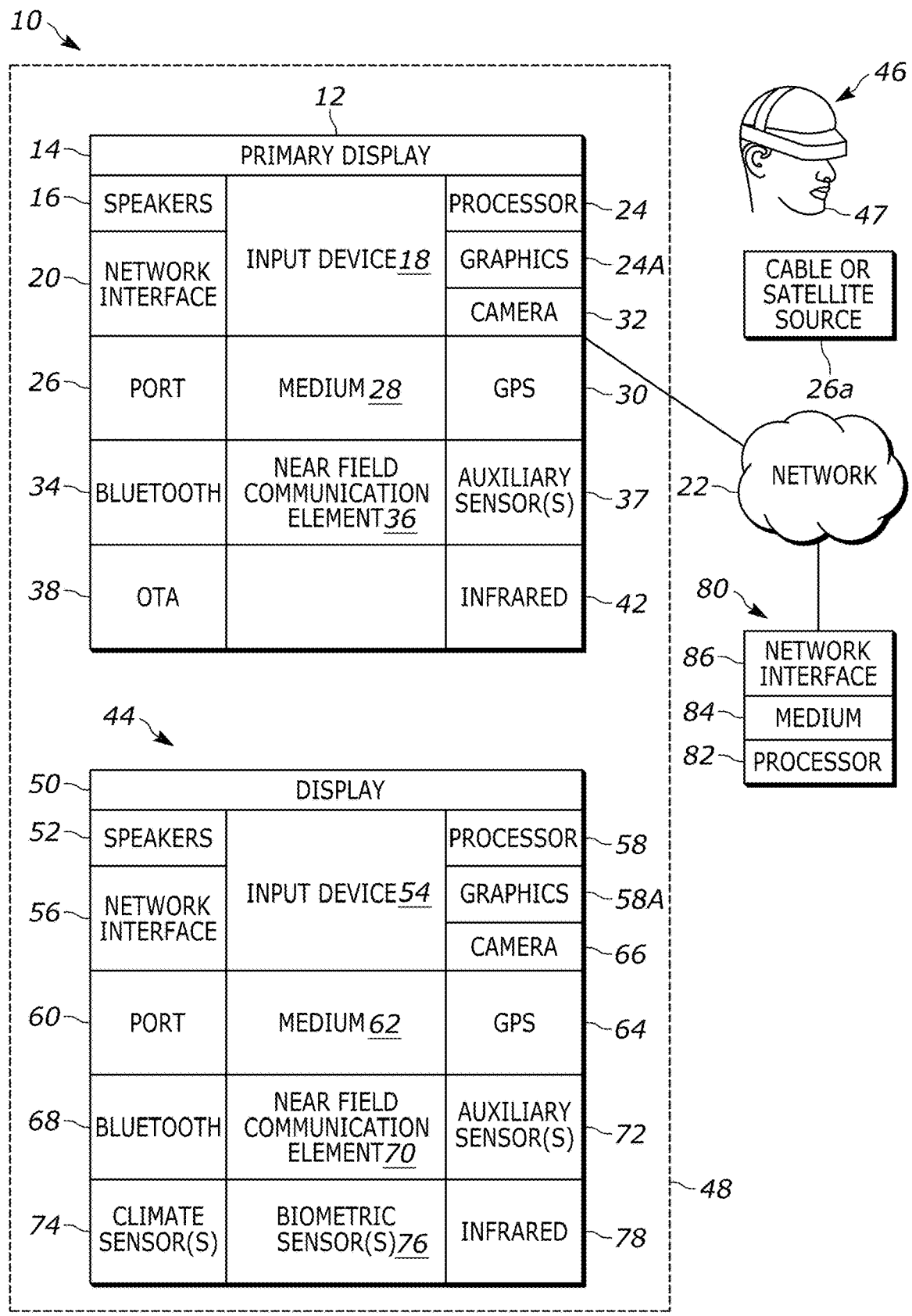
FIG. 1 is a block diagram of an example system including an example in accordance with present principles.

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C#or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
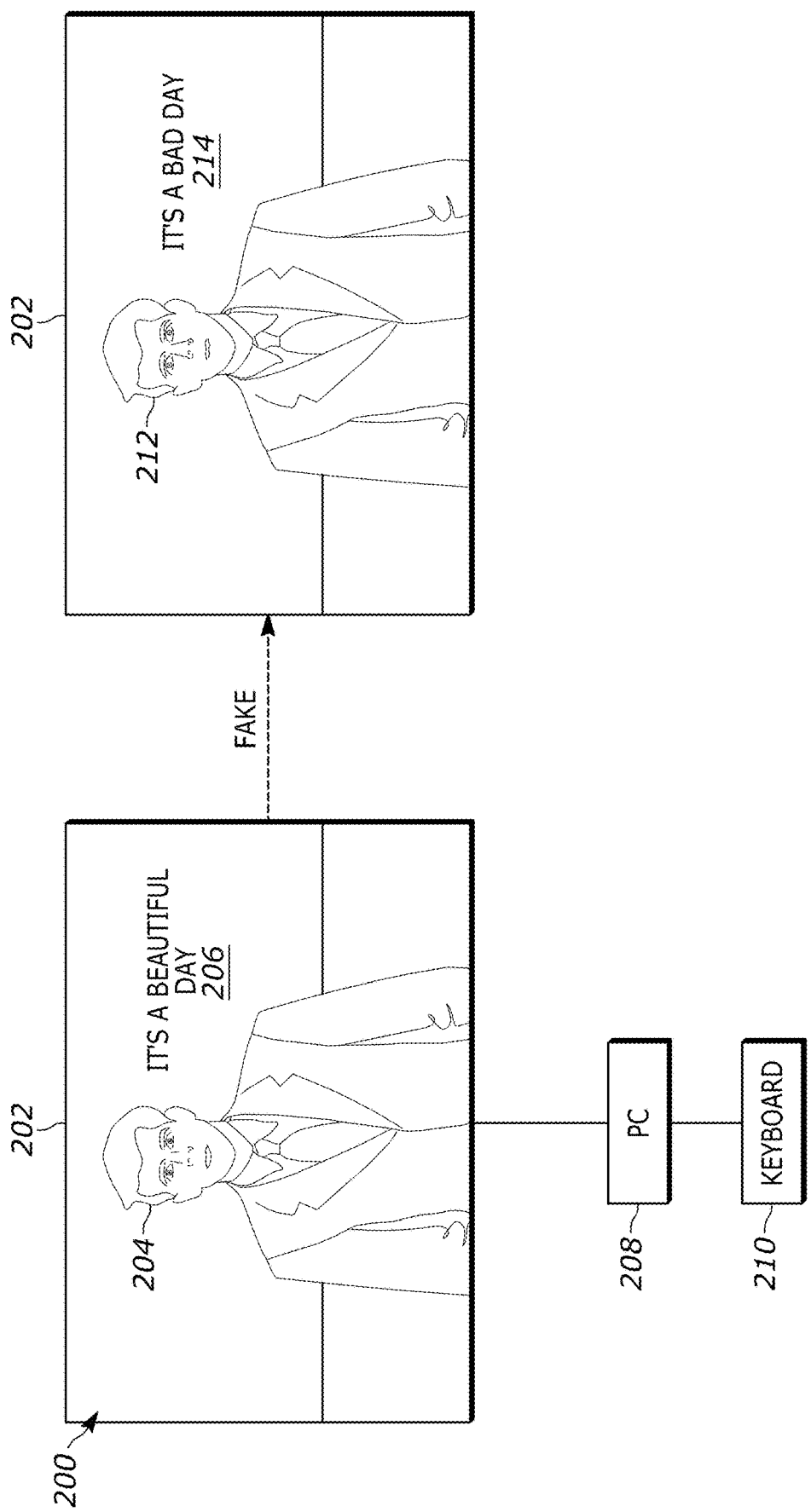
FIG. 2 is a schematic diagram illustrating a real video and a fake video derived from the real video.

Now referring to FIGS. 2-6, a first technique for determining whether an image is "fake", i.e., has been digitally altered from an original image, is illustrated. In FIG. 2, an original image 200 that may be presented on a display 202 is shown of a person having a face 204 speaking an audible phrase 206. The image 200 may be an image such as an I-frame from a video stream, and some or all of the frames of the video stream may be processed as disclosed herein.

A person operating a computer 208 with an input device 210 such as but not limited to a keyboard may alter the image and/or audio to produce an altered image 212 of the person, potentially depicted speaking an altered audible phrase 214. Present principles are directed to detecting that the altered image 212 in fact has been altered from the original 200.

Figure 3:
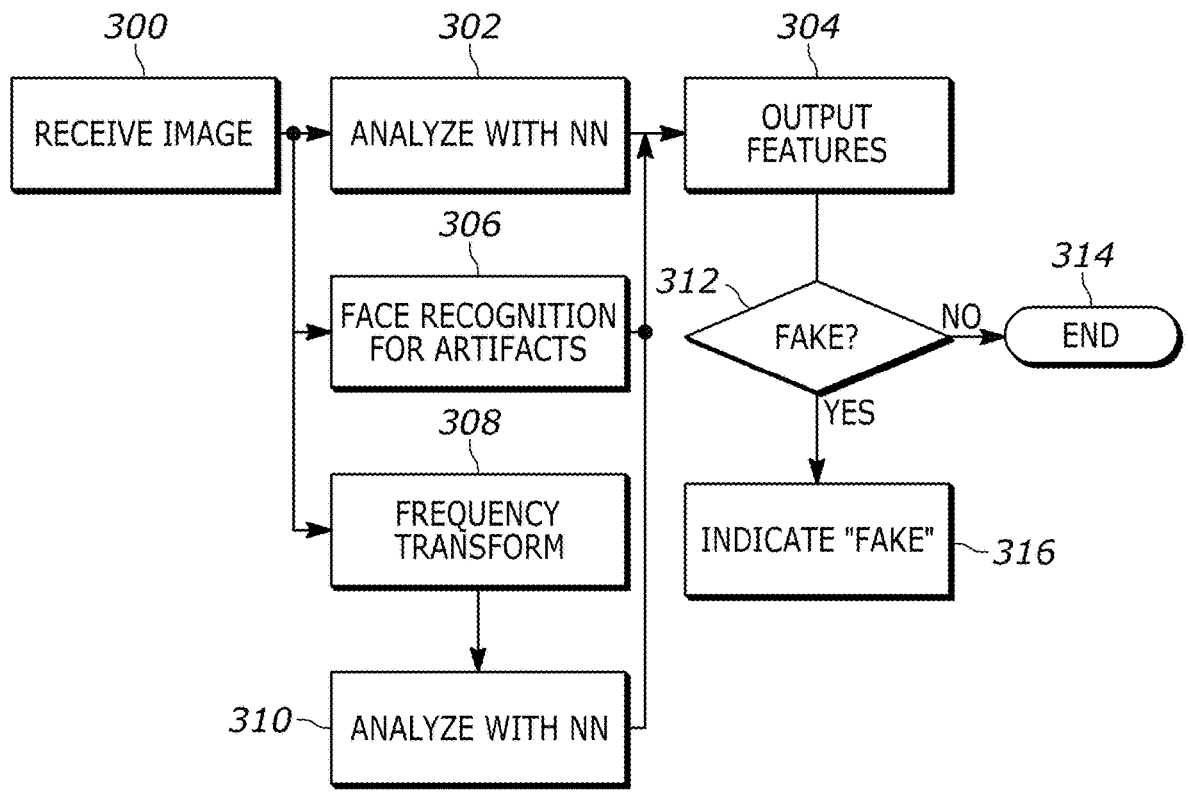
FIG. 3 is a flow chart of example logic for detecting fake videos that uses both image processing and frequency domain analysis.
Figure 6:
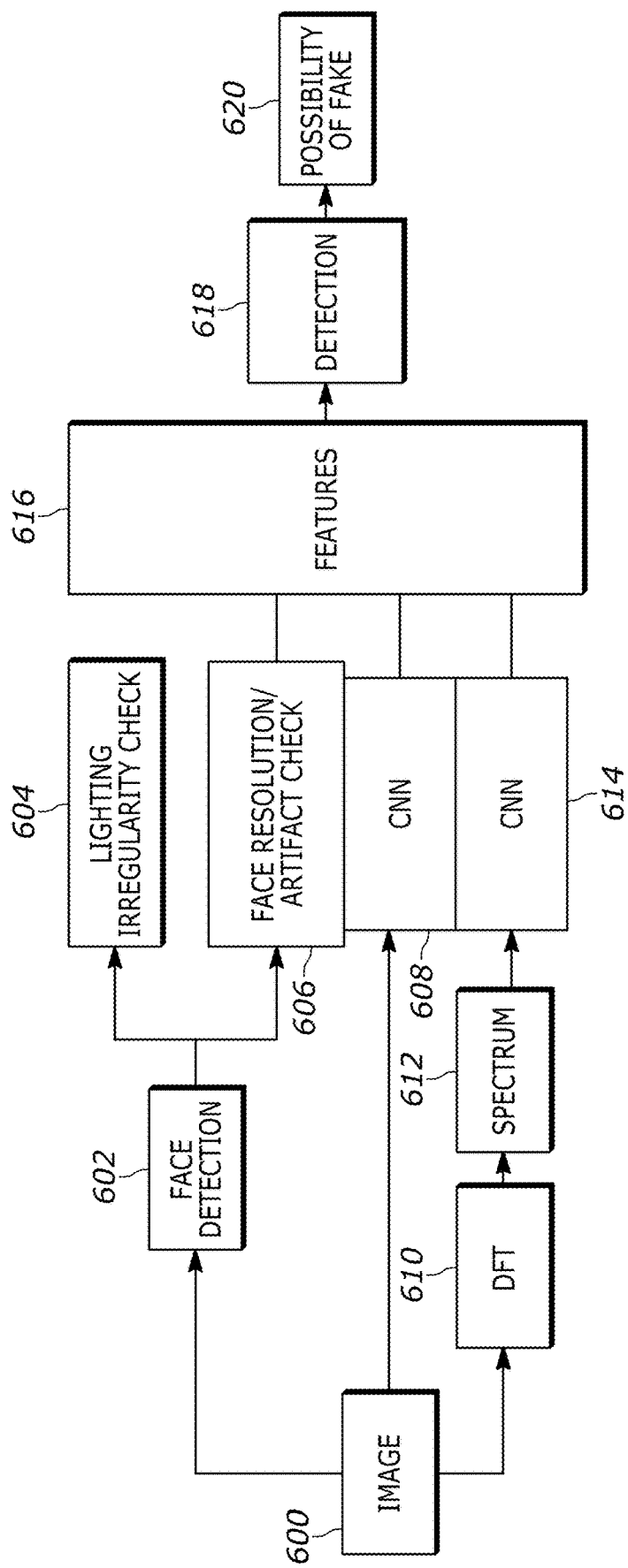
FIG. 6 is a block diagram of an example neural network architecture for executing the logic of FIG. 3.

FIG. 3 illustrates logic that may be executed in the first technique while FIG. 6 provides an example architecture that may embody the logic of FIG. 3. Commending at block 300, an image is received. The image can be directly analyzed at block 302 by processing the image through a first neural network (NN) such as a convolutional NN (CNN). The first NN outputs feature vectors representing the image at block 304.

Also, at block 306 the image may be input to a face recognition module to analyze for artifacts, also referred to herein as irregularities, in the face and/or background of the image, as well as lighting irregularities in the image. The face recognition module, which may employ one or more NNs, outputs feature vectors to block 304.

By way of example, an irregularity in a face in the image (spatial domain) may include a small region having a checkerboard-like appearance, indicating blurry resolution owing to digital altering.

Furthermore, the image may be converted to the frequency domain at block 308 using, for example, a discrete Fourier transform (DFT) that outputs a frequency spectrum which is analyzed at block 310 with another NN such as a CNN to detect irregularities in the image in the frequency domain. Feature vectors representing the spectrum are provided to block 304.

By way of example, an irregularity in the frequency domain may include one or more bright spots along the periphery of a graphic representation of the image in the frequency domain.

Moving to decision diamond 312, a detection module which may include one or more NNs analyzes the feature vectors form block 304 to determine whether one or more irregularities exist in the spatial and/or frequency domains. If no irregularities exist the process may end at state 314, but in some implementations, if any irregularity exists in any domain, an indication may be returned at block 316 that the image is fake. In other implementations, an indication may be returned at block 316 that the image is fake only if both an irregularity exists in the spatial domain and an irregularity exists in the frequency domain.

Figure 4:
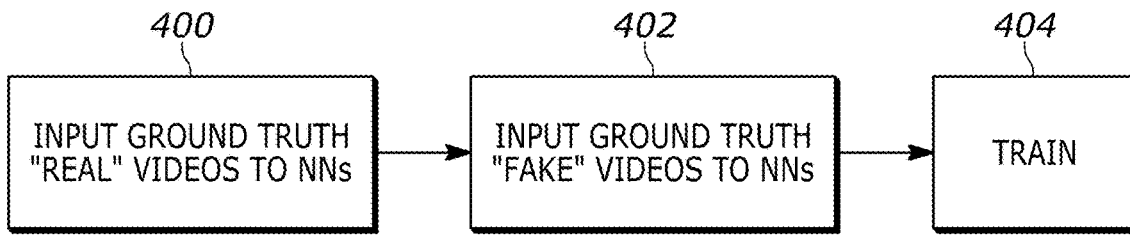
FIG. 4 is a flow chart of example logic for training the neural networks used in FIG. 3.

Referring briefly to FIG. 4, a process is shown for training the NNs discussed herein. Commencing at block 400, ground truth original, unaltered images are input to the NN. Also, ground truth altered, or fake images are input to the NN at block 402. The fake images may be generated using "deepfake" techniques from the ground truth original images by the designer. The NN may be programmed to start analysis using for example any or the example irregularities discussed above for both the frequency and spatial domains. The NN is trained on the ground truth inputs at bock 404. Reinforcement learning subsequently may be applied to refine training of the NN at block 404.

Figure 5:
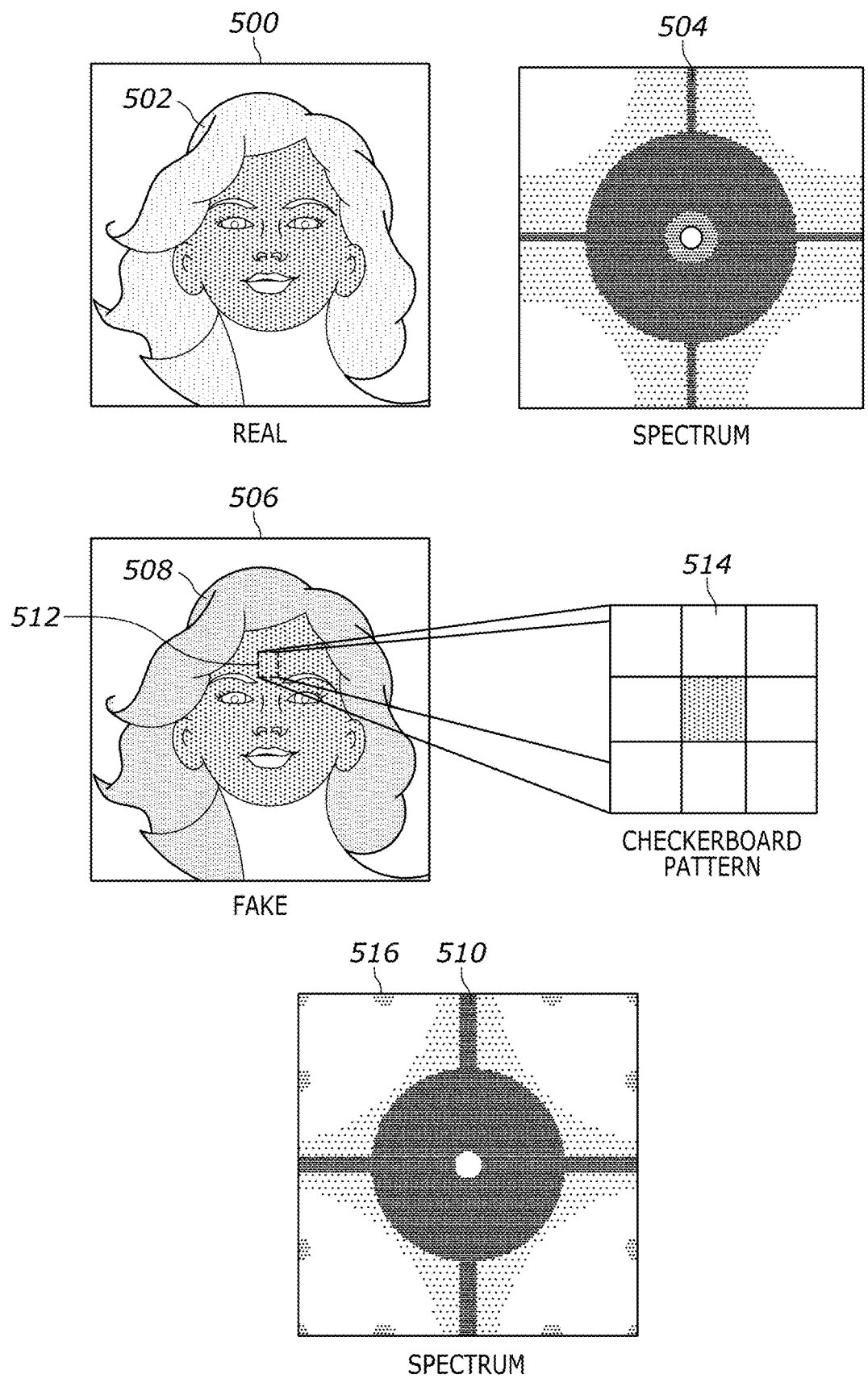
FIG. 5 shows an illustration of a real video frame and a counterpart fake video frame, illustrating artifacts in the fake frame.

FIG. 5 illustrates example spatial and frequency domain irregularities. An original image 500 is shown in an original spatial domain 502 and original frequency domain 504. An altered image 506 of the original image 500 has an altered spatial domain image 508 and an altered frequency domain depicted at 510.

As shown, a region 512 in the altered spatial domain image 508 has a checkerboard pattern enlarged and depicted at 514. Lighting irregularities also may exist between the original and altered images.

One or more frequency domain irregularities 516 also may be detected in the representation of the image in the frequency domain 510. The frequency domain irregularities 516 may include bright spots along the edges or periphery of the frequency domain graphic depiction as shown. In the example shown, two bright spots per side exist, indicating an image-altering-produced irregularity in the frequency domain.

FIG. 6 illustrates an example architecture that may be used to embody the logic of FIG. 3. An image 600 to be tested for alteration is input to a face detection module 602, which analyzes the image in the spatial domain to detect at a neural network (NN) 604 of the module 602 lighting irregularities in the image as well as face resolution/irregularity checks at 606. The face detection module 602 may employ image recognition principles and may be embodied by one or more NNs.

Also, the image 600 may be input directly to a NN 608 for direct analysis using additional rules, which may be a CNN. It should be noted that the NN 608 extracts feature vectors of the image. Also, the NN 604 executes image processing and is particularly advantageous in the absence of sufficient training data. However, the NNs 604, 608 may be implemented by a single NN.

Furthermore, the image 600 is processed through a discrete Fourier transform (DFT) 610, which outputs a spectrum 612 representing the image 600 in the frequency domain. The spectrum 612 is sent to a CNN 614 for analyzing the spectrum.

The face recognition module 602 (including lighting irregularity check 604 and face resolution/artifact check 606), as wells as the CNNs 608 and 614, produce a group 616 of feature vectors representing the image 600 in both the spatial and frequency domains. A detection module 618, which may be implemented by one or more NNs such as a recurrent NN (RNN) such as a long short-term module (LSTM), analyzes the feature vectors to ascertain whether the image 600 contains digital alterations from an original image in accordance with principles advanced herein. If it does, at 620 an indication that the image 600 possibly is a fake is generated.

Figure 7:
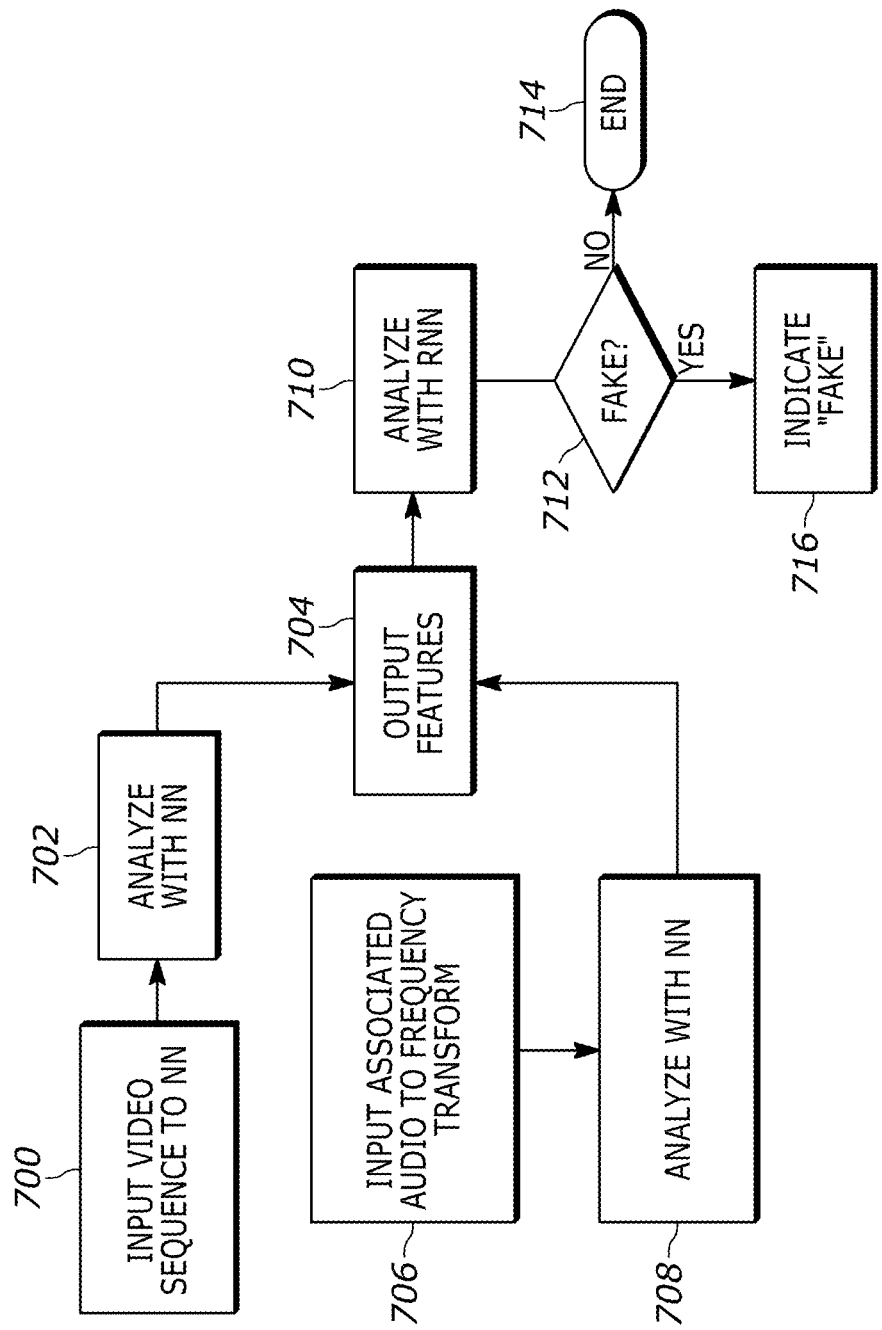
FIG. 7 is a flow chart of example logic for detecting fake videos using video sequence analysis.
Figure 8:
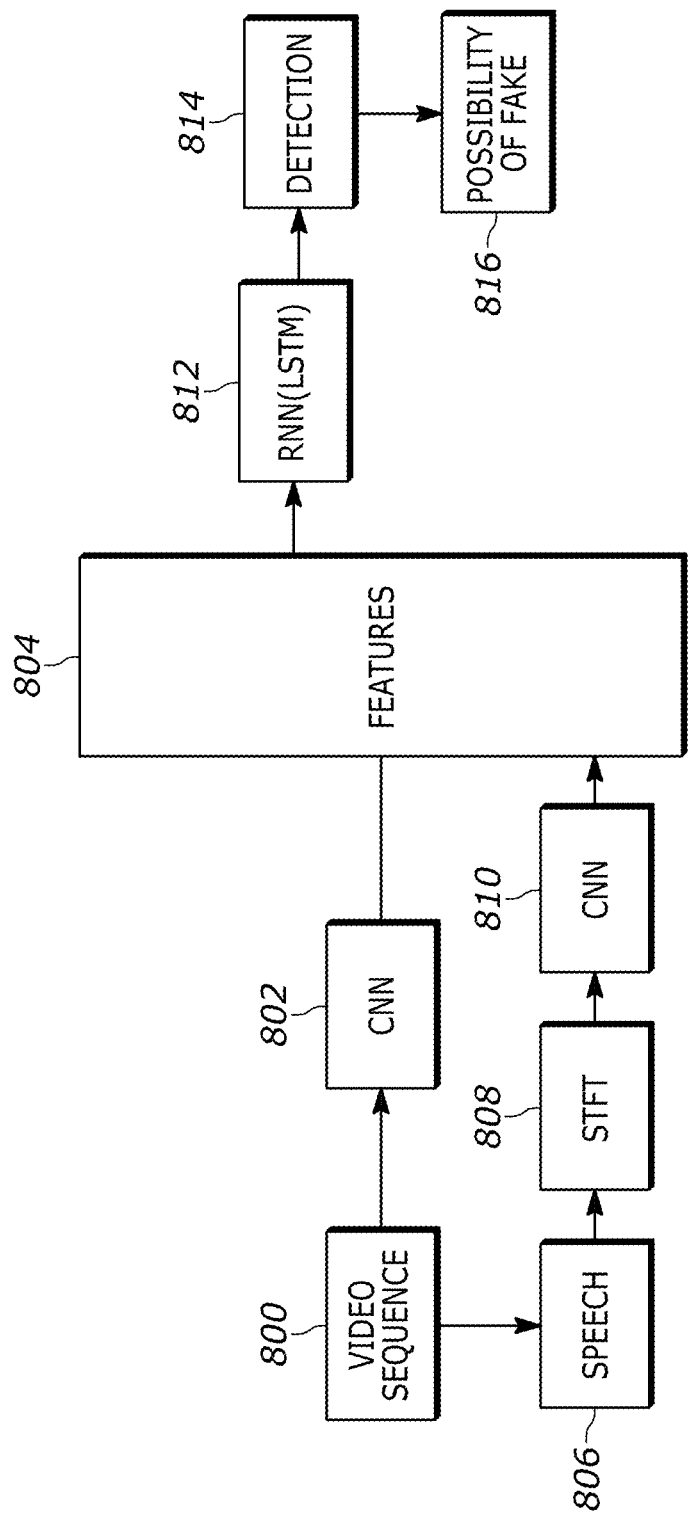
FIG. 8 is a block diagram of an example neural network architecture for executing the logic of FIG. 7.

FIG. 7 illustrates a second technique for detecting an altered video and FIG. 8 provides an example architecture for embodying the logic of FIG. 7. A video sequence, such as a video clip or other sequence of video frames, is input at block 700 to a NN. The sequence is analyzed at block 702 using the NN, which outputs feature vectors representing the video sequence at 704.

In analyzing the video sequence, the NN may be trained to learn natural human patterns of facial movement during, for example, speaking. As understood herein, when a video sequence is altered, the alterer may not precisely model the natural pattern of movement of, for instance, the lips, and so a slightly unnatural pattern of movement may be detected by the NN in a fake video sequence.

Also, audio associated with the video sequence is input at block 706 to a frequency transform. The spectrum output by the frequency transform 706 is provided to a NN at block 708 for analysis of the spectrum to output feature vectors to block 704 that represent the audio.

In analyzing accompanying audio, the NN may be trained to learn natural human speech characteristics, such as cadence, tone, pitch patterns, and emphasis. As understood herein, when audio, such as voice audio, is altered, the alterer may not precisely model the natural pattern of human speech. Accordingly, a slightly unnatural pattern of speech, such as unnatural cadence or tone or pitch, may be detected by the NN in a fake audio sequence. Training may be accomplished along the lines shown in FIG. 4, with ground truth audio and fake ground truth audio derived from the original ground truth audio being used as training sets.

The feature vectors 704 may be provided to a NN such as an RNN 710 to analyze the feature vectors to detect at decision diamond 712 whether the input video sequence and/or accompanying audio has been altered from an original. If no anomalies/irregularities are found, the process may end at state 714, but if an irregularity is detected, an indication that the video sequence may have been altered is output at block 716.

In some embodiments, an indication of a fake is output at block 716 if any irregularity is detected in either the audio or the video. In other embodiments, an indication of a fake is output at block 716 only if an irregularity is detected in both the audio and the video.

FIG. 8 illustrates an architecture that can be used to embody the logic of FIG. 7. A video sequence 800 is input to a NN 802 such as a CNN to extract feature vectors 804 therefrom. Also, audio such as speech 806 is input to a frequency transform 808 such as a short time Fourier transform (STFT) to generate a representation of the audio in the frequency domain, which is analyzed by a NN 810 such as a CNN to extract feature vectors therefrom. A NN 212 such as an RNN such as a LSTM analyzes the feature vectors according to principles described herein to detect, at block 814, any irregularities in the video sequence 800 and audio 806. State 816 indicates output of an indication that the input is possibly a fake.

Figure 9:
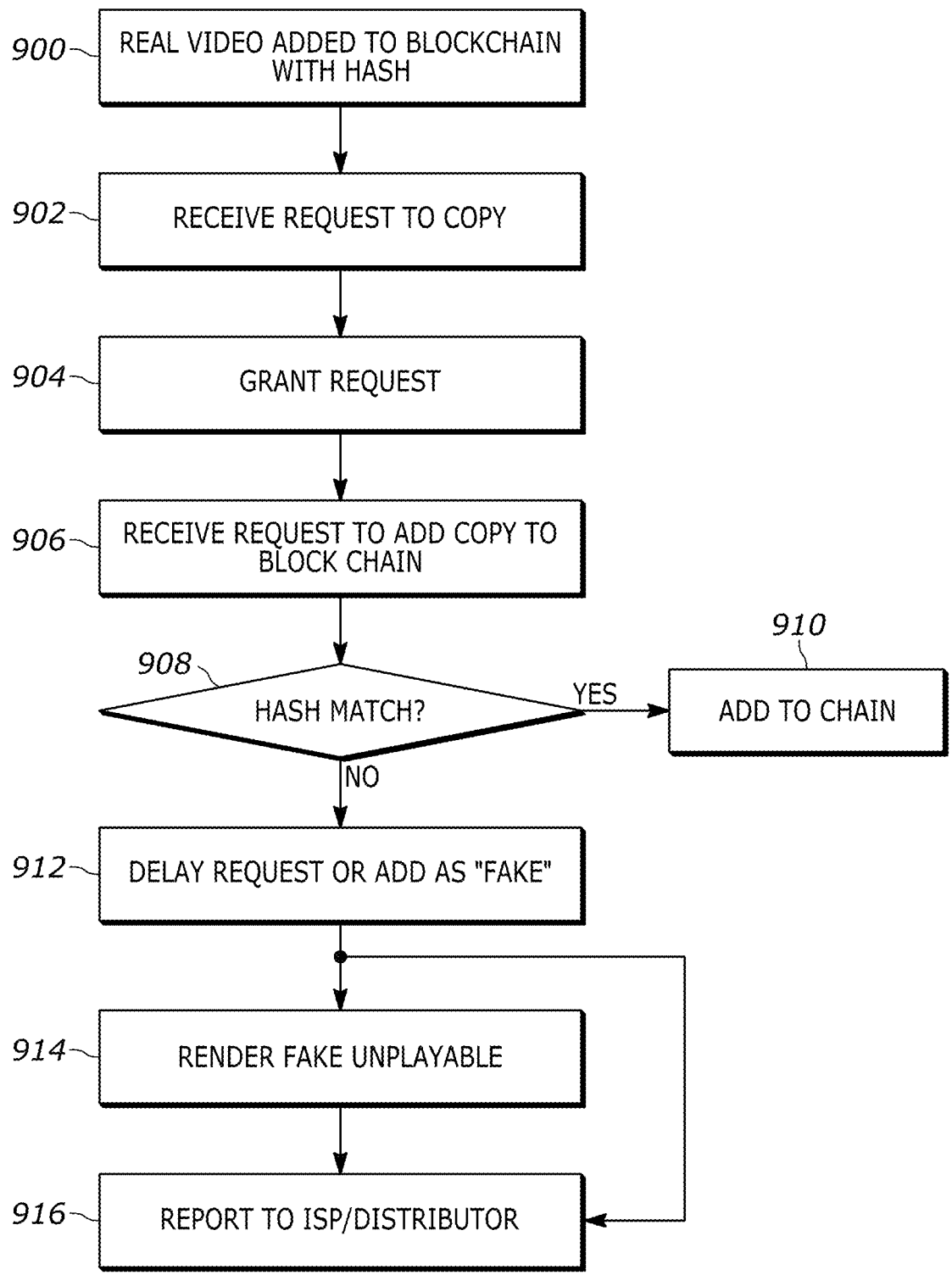
FIG. 9 is a flow chart of example logic for employing block chain technology to address fake video generation.

Turning now to FIG. 9, a third technique is shown for addressing fake video generation using block chain technology and/or digital fingerprint technology. Generally, hashing/signing of videos may be integrated into an imaging device such as a smart phone or other recording device using, for example, a web browser or encoded into hardware. Digital fingerprinting can be generated from the bits of data in the entire video or sub-tracks, such that if the video content is changed, the fingerprint also will change. The digital fingerprints can be generated together with metadata such as location and timestamp of where and when the video is originally made. Every time a video is sought to be redistributed, the distributor must request permission from the original one on the block chain and a new block for the new (copied) video is chained, making it easy to trace back to the original video and any node on the black chain. Before the video is uploaded again, the fingerprint of the video can be matched to the original fingerprint to determine if the video sought to be added has been manipulated.

For example, a video website may have a video fingerprint detector incorporated so every time a video is upload/downloaded, it will be logged and stamped. If the video is classified as fake based on the fingerprint not matching the original video fingerprint, it may be logged as such on the entire chain. This emulates an antivirus software but in this case all the users are protected at the same time.

Commencing at block 900, an original ("real") video is added to a video blockchain along with a hash of the video, which hash may function as a digital fingerprint and is typically based on pixel values or encoding information or other image-dependent values in the video. A request to copy the video may be received at block 902, and the request may be granted at block 904.

Moving to block 906, a request may be received to add a new video that is a copy of the original video back into the block chain. The request, to be valid, may be accompanied by a hash (fingerprint) on the new video. Proceeding to decision diamond 908, the hash of the video sought to be added to the block chain is compared to the hash of the original video from whence it was copied, and if the hashes match, the new video may be added at block 910 to the block chain.

On the other hand, if it is determined at decision diamond 908 that the hashes do not match, the logic may move to block 912 to either deny adding the new video to the block chain, or to add it to the block chain with an indication that the new video has been altered from the original and thus may be a fake. If desired, the altered video may be rendered inaccessible from the block chain or otherwise unplayable at block 914.

Figure 10:
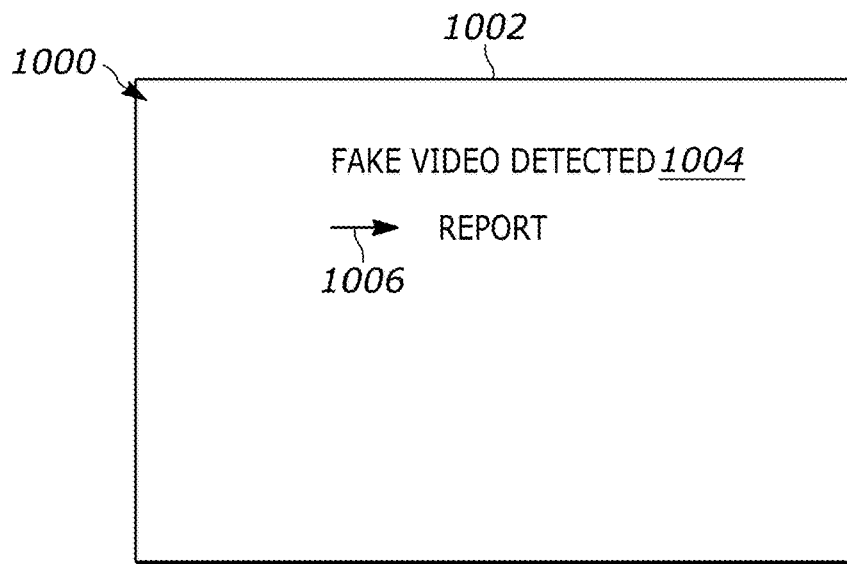
FIG. 10 is a screen shot of an example user interface (UI) for reporting a fake video to an internet service provider (ISP) or distributor so that the ISP/distributor can remove the video from public view.

Moreover, upon detection of an altered video, the logic may move to block 916 to report to the internet service provider (ISP) or other distributor of the new, altered video that the video has in fact been digitally altered from an original video and thus should be examined for deciding whether to remove the new (altered) video from public view. FIG. 10 illustrates.

As shown, a user interface (UI) 1000 may be presented on a display 1002 of a device executing the logic of FIG. 9 and/or receiving information from a device executing the logic of FIG. 9. The UI 1000 may include a prompt 1004 that a potentially fake video has been detected. The UI 1000 may also include a selector 1006 to enable a user to report the existence of the fake along with identifying information to a distributor or other authority.

Figure 11:
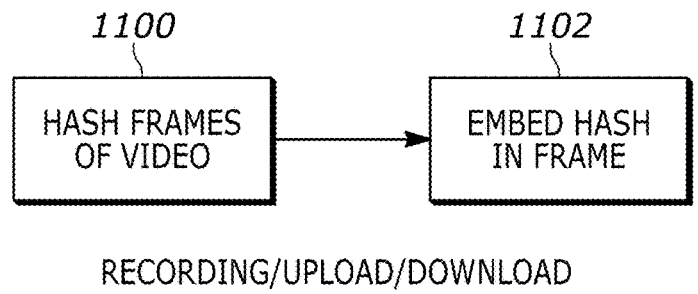
FIG. 11 is a flow chart of example logic for recording or uploading or downloading a video along with an embedded verification hash in the video.
Figure 12:
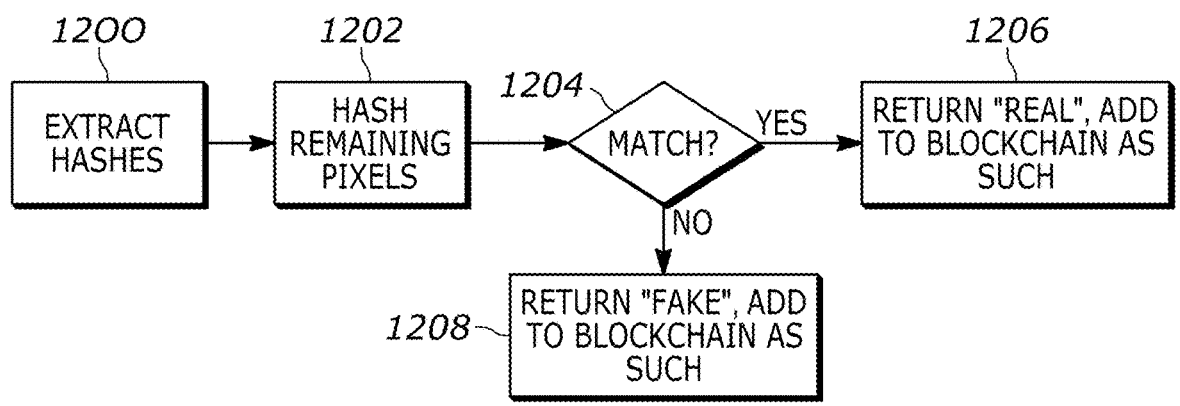
FIG. 12 is a flow chart of example logic for playing back the video recorded or accessed in FIG. 11 in which the hash is used for verification of authenticity.

FIGS. 11 and 12 illustrate additional fingerprint logic. Commencing at block 1100 of FIG. 11, pursuant to creation of a new original video and/or upon uploading or downloading of the video, for at least some and in some embodiments for all frames of the video, a hash is performed in the frame. Proceeding to block 1002, the hash is ten embedded into the frame from whence it was derived.

In examples, the hash of a video frame may be steganographically embedded in the video frame, in a way that is undetectable to the naked eye and may be distributed uniformly across the video frame. For example, the pixels of each piece of the steganographic hash can be in a known location, either because it is always in a fixed location, or because the location is contained in the video metadata for the frame (allowing for every frame to be different). Knowing this location allows pixels representing the hash to be excluded from the video data that is hashed. In other words, the original hash is created only from non-steganographically altered pixels. This location may also be used by video compression algorithms to ensure that pixels representing the hash are not compressed or altered in a way that would affect the hash.

FIG. 12 illustrates that video playback software would then reverse this process. Commencing at block 1200, the steganographically embedded hash is extracted from the video frame. Moving to block 1202, the remaining pixels of the video frame are hashed. Proceeding to decision diamond 1204, the fresh hash is compared with the hash extracted from the frame. If they match, the frame has been unaltered from the original source video and so the logic moves to block 1206 to indicate such, and if desired to add to the block chain the video (assuming all or at least a threshold number of frame hashes match). If the hashes do not match, the logic moves to block 1208 to indicate that the video being viewed has been altered from the original, with (for example) a red border or highlight around the frame which has been altered. Even the altered portion of the frame may be outlined.

This same verification process may be executed on a backend server that detects fakes and either proactively prevents them from being published or appends a warning to the video.

If any bad-faith actor altered the source video in any meaningful way, the frames would hash differently and/or the embedded steganographic hash would be corrupted. As long as there are good-faith actors on both ends of this activity, the alteration of the video is detectable.

Figure 13:
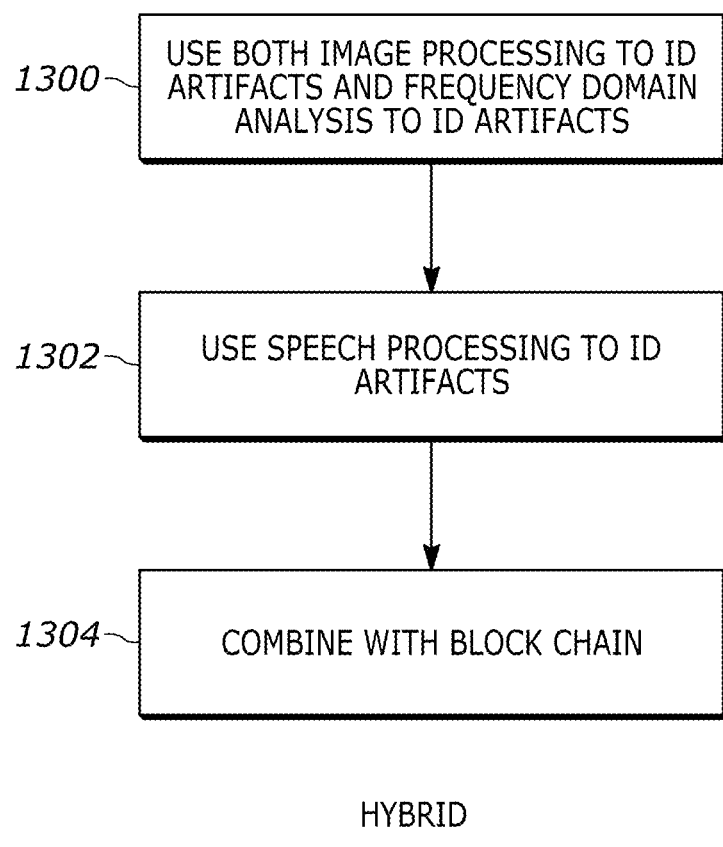
FIG. 13 is a flow chart of example logic for hybrid logic using previous principles.

FIG. 13 illustrates that hybrid techniques combining above principles may be employed. Block 1300 indicates that both image processing/video sequencing coupled with frequency domain analysis may be used to identify artifacts/irregularities in videos. Block 1302 indicates further that speech processing may be used in combination with any of the above techniques to identify artifacts/irregularities in videos. Block 1304 indicates that the identification of artifacts/irregularities in videos may be combined with the block chain technique to track original (real) videos and copies thereof that have been altered (fake).

Figure 14:
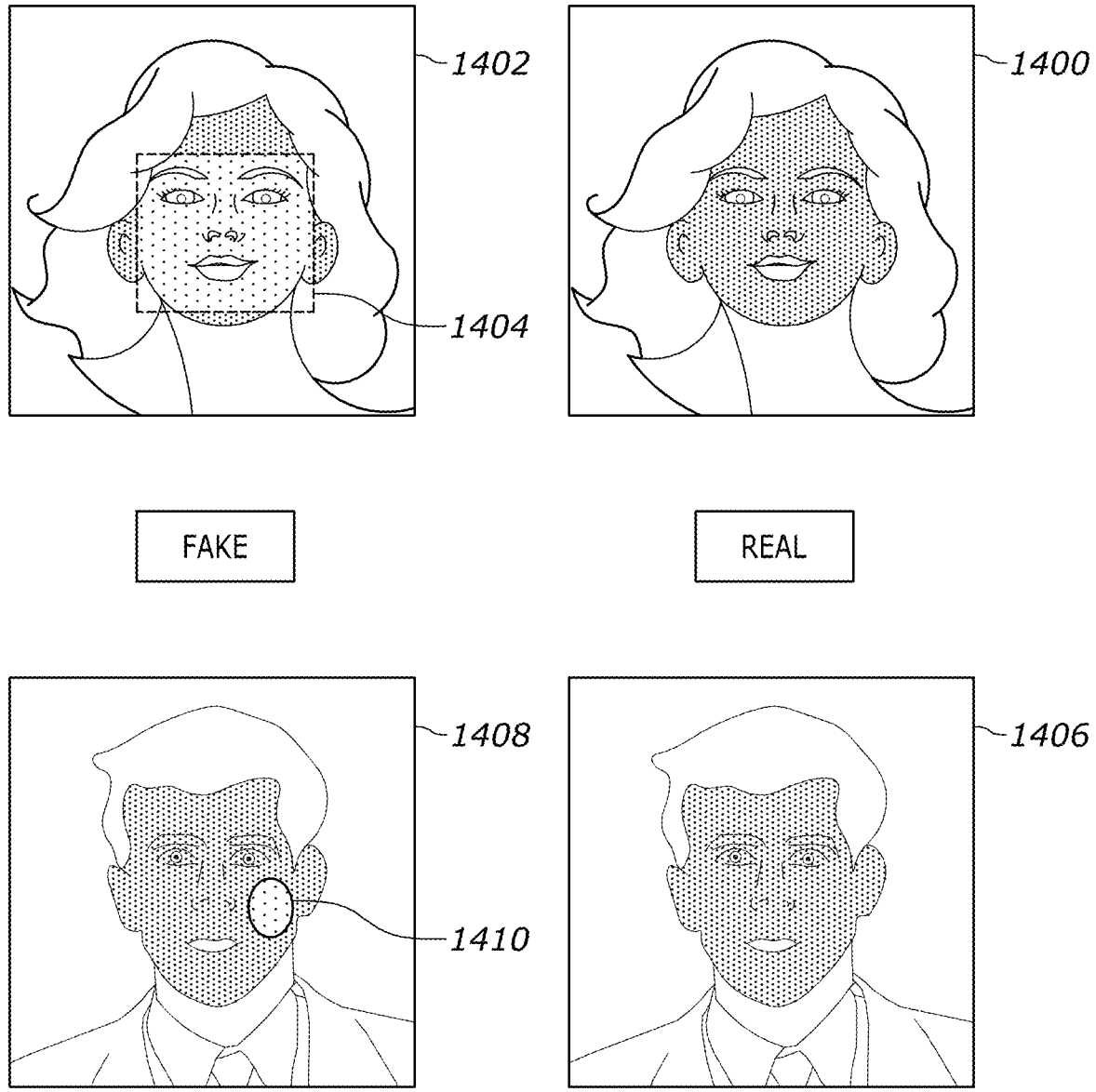
FIG. 14 illustrates example lighting artifacts in two sets of real and altered images.
Figure 15:
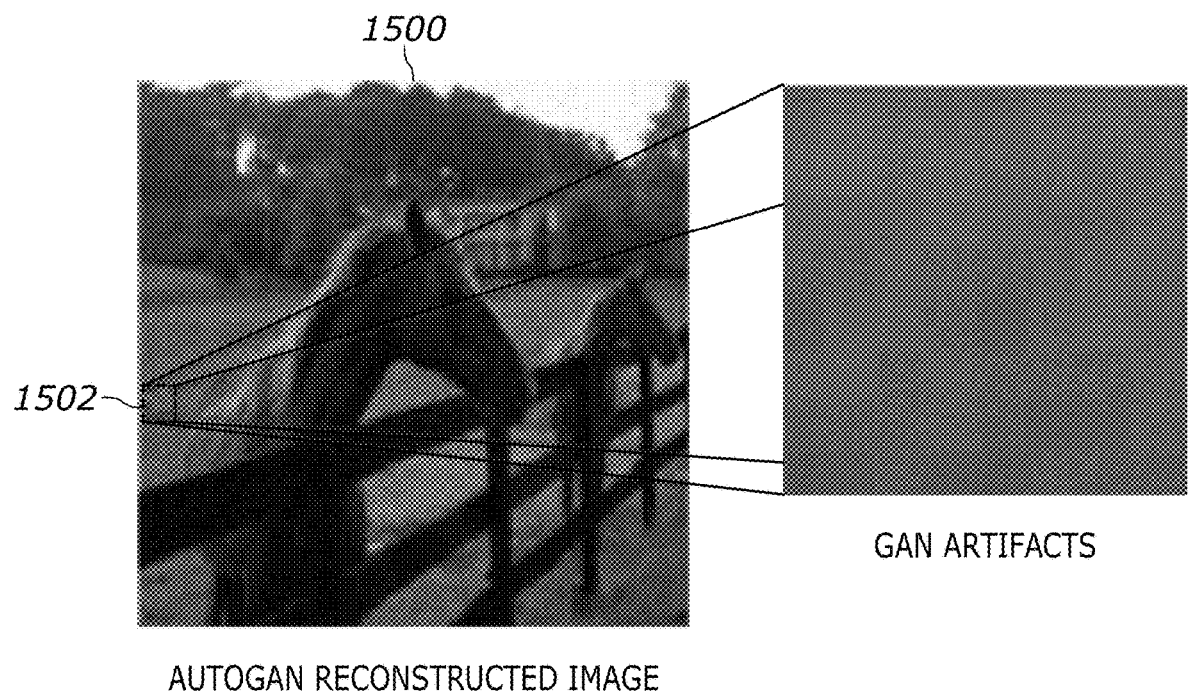
FIG. 15 illustrates an example generative adversarial network (GAN) artifact or irregularity in an image.
Figure 16:
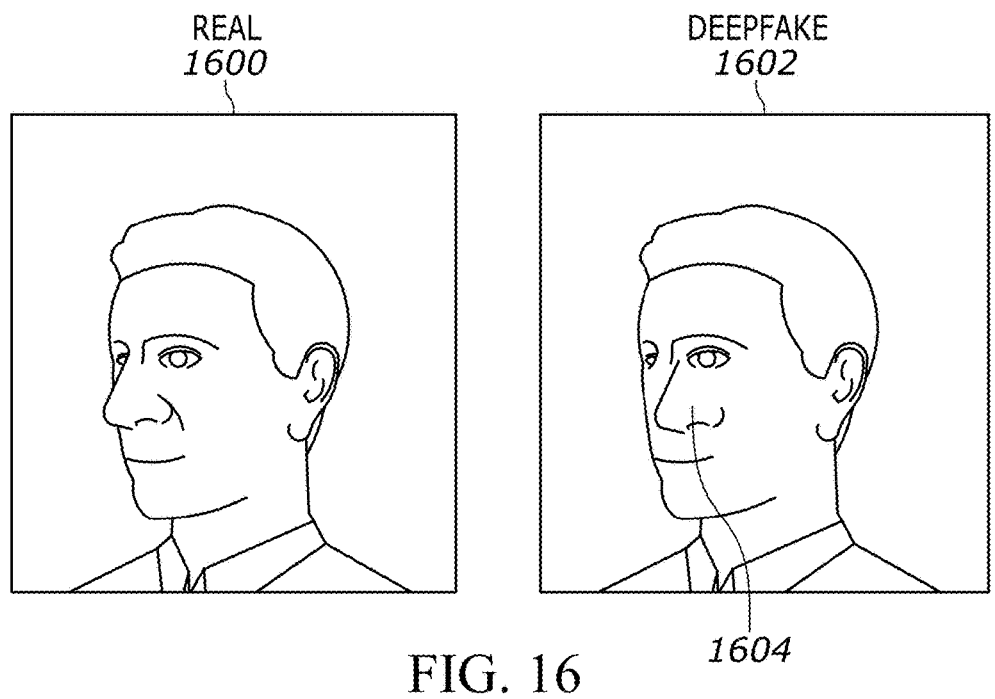
FIG. 16 illustrates another GAN-related artifact or irregularity using a real and altered image.

FIGS. 14-16 provide additional examples of artifacts or irregularities that can appear in altered images, labeled "fake" images in the figures. A first real image 1400 in FIG. 14 has been altered to produce a corresponding altered image 1402 in which, in a region 1404, lighting appears to be brighter than in the corresponding region in the first real image 1400. Likewise, a second real image 1406 has been altered to produce an altered image 1408 in which lighting in a region 1410 on the face appears to be brighter than in the real image 1406. The resolutions of the altered images 1402, 14108 are also less than the resolutions of the corresponding real image 1400, 1406, meaning that the NNs can learn to distinguish altered images on the basis of either or both lighting irregularities and resolution decreases.

FIG. 15 illustrates an altered image 1500 in which, in a small area 1502, image irregularities or artifacts exist due to generative adversarial network (GAN) upsampling executed to produce the altered image 1500. As shown in the exploded view 1504 of the region 1502, the GAN irregularity may include a uniformly solid color of a region of the image in which non-uniform solid color subject matter (in the example shown, grass with various degrees of shading) appears in the original image.

FIG. 16 illustrates a real image 1600 and an altered image 1602 derived from the real image 1600 by superimposing the face of another person onto the face of the subject in the real image 1600. As shown at 1604, this superimposition results in misalignment of the face to the head or the rest of the body, in this case, the misalignment of the nose to the angle at which the head is depicted.

It will be appreciated that whilst present principals have been described with reference to some example embodiments, these are not intended to be limiting, and that various alternative arrangements may be used to implement the subject matter claimed herein.

What is claimed is:

1. A system comprising:
    at least a first neural network for receiving an image having at least one digitally altered texture on a face in the image or an artifact between the face and background in the image or both, the first neural network outputting first feature vectors indicating in the spatial domain the digitally altered texture;
    at least one discrete Fourier transform (DFT) for receiving the image and outputting a spectrum in a frequency domain to at least a second neural network, the second neural network outputting second feature vectors indicating in the frequency domain the digitally altered texture;
    at least a detection module for accessing the first and second feature vectors output by the first neural network, and the second neural network to determine whether the image is altered from an original image and to provide output representative thereof, the detection module providing the output that the image is altered responsive to identifying both the digitally altered texture in the spatial domain and the digitally texture in the frequency domain and not providing the output that the image is altered responsive to not identifying the digitally altered texture in the spatial domain or not identifying the digitally texture in the frequency domain.

2. The system of claim 1, wherein the detection module provides the output responsive to identifying a checkerboard pattern in the digitally altered texture.

3. The system of claim 1, wherein the detection module provides the output responsive to identifying regions of brightness located along the periphery of the image in the frequency domain, the regions of brightness comprising plural bright spots per side edge of the image.

4. The system of claim 1, comprising at least one face detection module configured for outputting a feature vector indicating a lighting difference on the face in the image indicating that the image has been altered from the original image.

5. A method comprising:
    processing an image in a spatial domain to output first feature vectors;
    converting the image to a frequency domain;
    processing the image in the frequency domain to output second feature vectors; and
    returning an indication that the image has been altered from an original image at least in part based on the first feature vectors indicating that the image contains at least one artifact in the spatial domain and the second feature vectors indicating that the image contains at least one artifact in the frequency domain, and not returning an indication that the image has been altered from the original image responsive to either of the first feature vectors not indicating that the image contains at least one artifact in the spatial domain or the second feature vectors not indicating that the image contains at least one artifact in the frequency domain.

6. The method of claim 5, wherein the at least one artifact in the spatial domain comprises a texture artifact on a face in the image or a texture artifact between the face and background in the image or both.

7. The method of claim 5, wherein converting the image to the frequency domain comprises processing the image through at least one discrete Fourier transform (DFT) and at least one neural network to output the second feature vectors indicating the at least one artifact in the image in a frequency domain.

8. The method of claim 5, comprising outputting the first feature vectors indicating that the at least one artifact in the spatial domain comprises at least one lighting artifact on the face in the image.

9. An apparatus comprising:
    at least one computer storage medium comprising instructions executable by at least one processor to:
    process an image in at least one spatial domain to determine whether the artifact exists in the image in the at least one spatial domain;
    convert the image to at least one frequency domain;
    process the image in the at least one frequency domain to determine whether an artifact exists in the frequency domain; and
    provide indication that the image is digitally altered responsive to both the artifact in the at least one frequency domain and the artifact in the at least one spatial domain existing in the image, and not provide indication that the image is digitally altered responsive to either the artifact in the at least one frequency domain not existing in the image or the artifact in the at least one spatial domain not existing in the image.

10. The apparatus of claim 9, comprising the at least one processor.

11. The apparatus of claim 9, wherein the instructions are executable to:
    convert the image to the at least one frequency domain at least in part using a discrete Fourier transform.

12. The apparatus of claim 9, wherein the instructions are executable to:
    process the image in the at least one spatial domain using at least one machine learning (ML) model.

13. The apparatus of claim 9, wherein the instructions are executable to:
    process the image in the at least one frequency domain using at least one machine learning (ML) model.

* * * * *